Mar. 6, 1923.

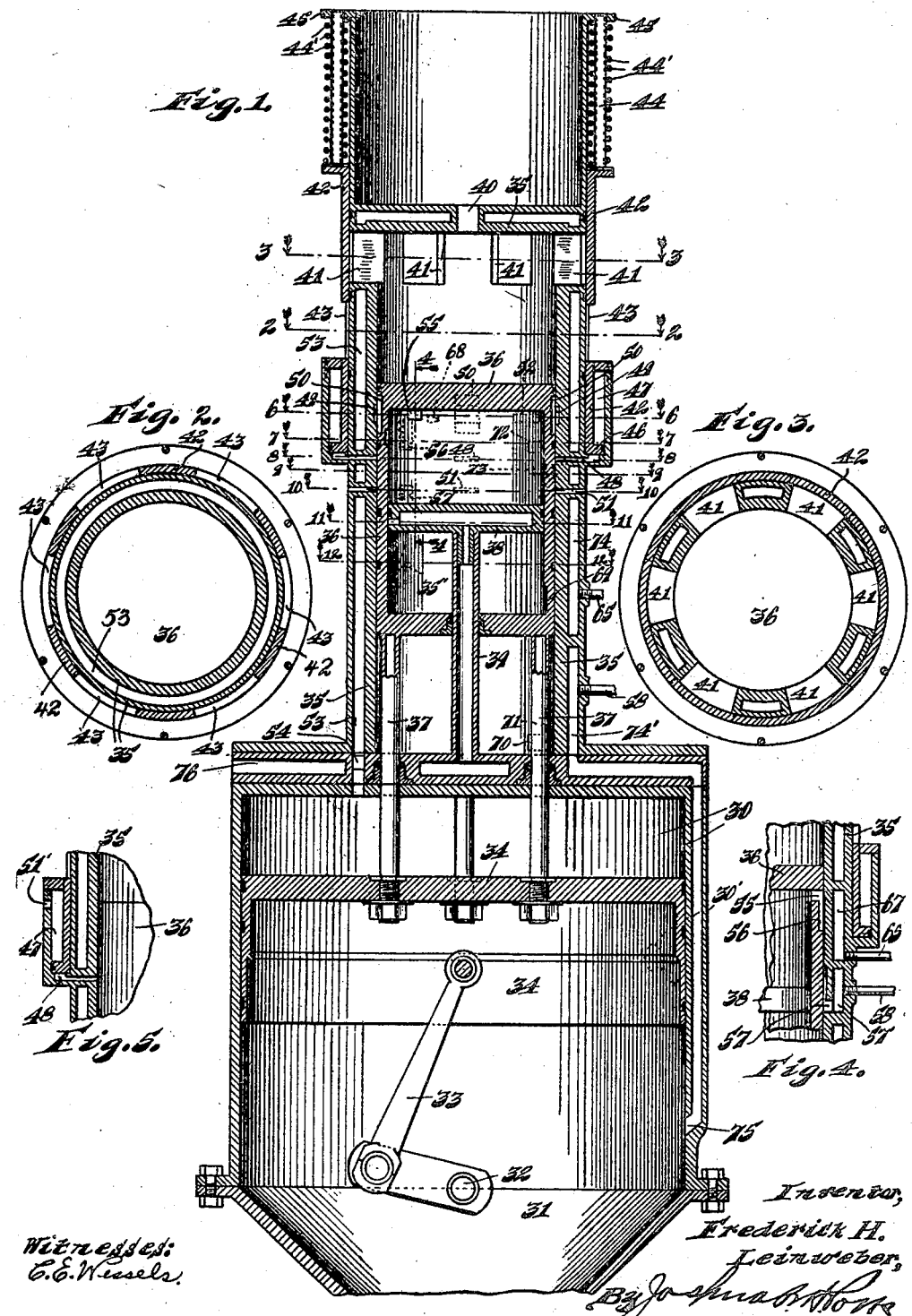
Mar. 6, 1923.
F. H. LEINWEBER.
INTERNAL COMBUSTION ENGINE.
FILED OCT. 23, 1916.
1,447,672.
3 SHEETS—SHEET 1.

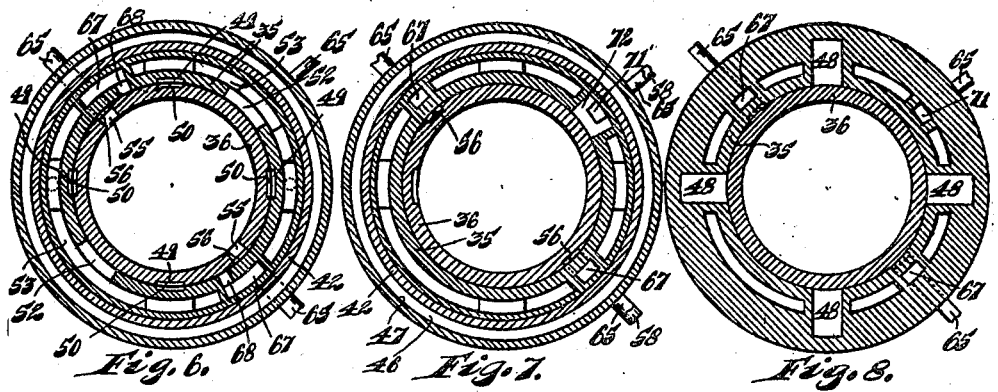
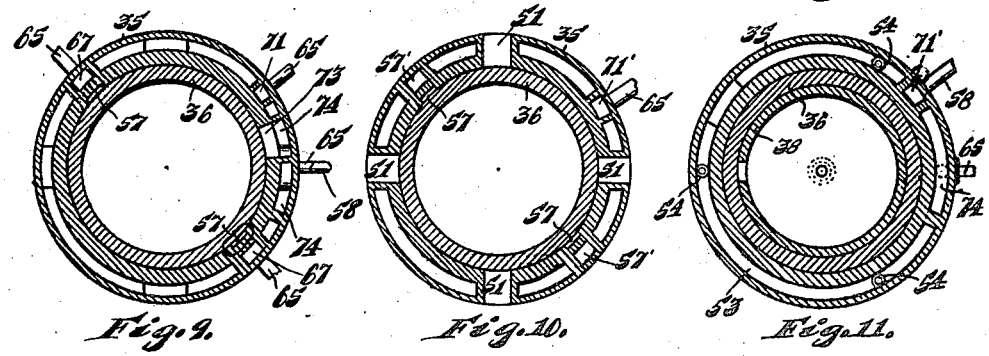
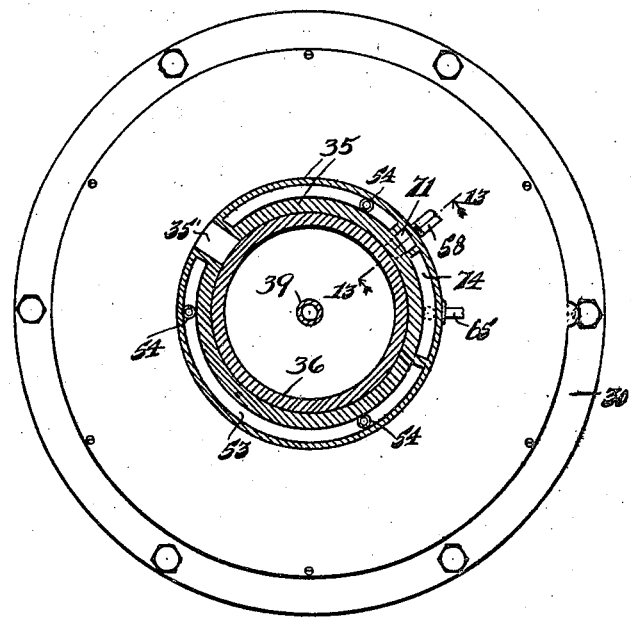
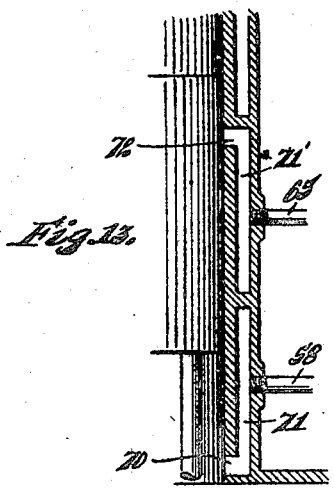

F. H. LEINWEBER.
INTERNAL COMBUSTION ENGINE.
FILED OCT. 23, 1916.

1,447,672.

3 SHEETS—SHEET 3.

Witness:
John Enders
Merrill M. Blackburn

Inventor:
Frederick H. Leinweber
by Wallace R. Lane
Atty.

Patented Mar. 6, 1923.

1,447,672

UNITED STATES PATENT OFFICE.

FREDERICK H. LEINWEBER, OF CHICAGO, ILLINOIS; CURTIS H. LEINWEBER, WILLIAM H. LEINWEBER, AND VICTOR H. LEINWEBER EXECUTORS OF SAID FREDERICK H. LIENWEBER, DECEASED.

INTERNAL-COMBUSTION ENGINE.

Application filed October 23, 1916. Serial No. 127,291.

*To all whom it may concern:*

Be it known that I, FREDERICK H. LEINWEBER, a citizen of the United States, and a resident of the city of Chicago, county of Cook, and State of Illinois, have invented certain new and useful Improvements in Internal-Combustion Engines, of which the following is a specification.

My invention relates to improvements in internal combustion engines, and has for its object, the provision of an improved construction of this character capable of operating with great efficiency.

The invention consists in the combinations and arrangements of parts hereinafter described and claimed.

Figure 14:
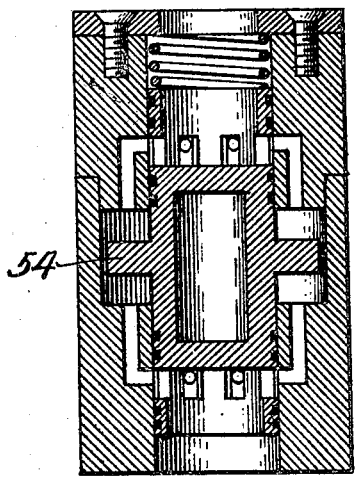
Figure 15:
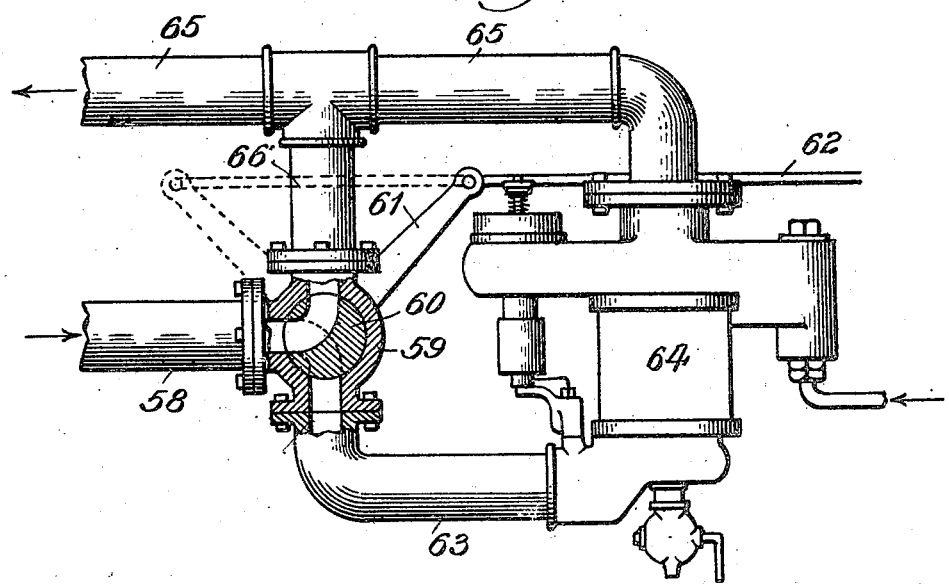

The invention will be best understood by reference to the accompanying drawings forming a part of this specification, and in which, Fig. 1 is a vertical section of an engine embodying my invention, Fig. 2, a section taken on line 2—2 of Fig. 1, Fig. 3, a section taken on line 3—3 of Fig. 1, Fig. 4, a section taken on line 4—4 of Fig. 1, Fig. 5, a detail section illustrating a slightly modified form of construction for operating the exhaust valve, Fig. 6, a section taken on line 6—6 of Fig. 1, Fig. 7, a section taken on line 7—7 of Fig. 1, Fig. 8, a section taken on line 8—8 of Fig. 1, Fig. 9, a section taken on line 9—9 of Fig. 1, Fig. 10, a section taken on line 10—10 of Fig. 1, Fig. 11, a section taken on line 11—11 of Fig. 1, Fig. 12, a section taken on line 12—12 of Fig. 1, Fig. 13, a section taken on line 13—13 of Fig. 12, Fig. 14, an enlarged section of a check valve employed in the engine, Fig. 15, a detail view illustrating a carbureter connection employed in the engine.

The form of construction, illustrated in Figs. 1 to 13 inclusive, comprises a lower cylinder 30 mounted upon a suitable closed crank case 31 having a crank shaft 32 operating therein and connected by means of a connecting rod 33 with a piston 34 operating in cylinder 30. Another cylinder 35 is arranged co-axially with cylinder 30 to cooperate therewith, and a cylinder-piston 36 is arranged to reciprocate within the cylinder 35. The cylinder-piston 36 is rigidly connected by means of rods 37 passing through suitable stuffing boxes in the inner end of cylinder 35 with piston 34 to move in unison therewith, both the cylinder 35 and the cylinder-piston 36 being closed at both ends, as shown. A stationary piston 38 is arranged within the cylinder-piston 36, upon a hollow stem or pedestal 39, as shown. The outer end or head of cylinder 35 is provided with a central opening 40 for the usual spark plug, and exhaust ports 41 are arranged in the walls of cylinder 35, adjacent its head. A sleeve valve 42 is arranged to reciprocate on the outer wall of cylinder 35 and is provided with ports 43 arranged to register with ports 41 to permit of exhaust of cylinder 35. Guide rods 44 are secured to sleeve valve 42 arranged to slide in perforations in a guide flange 45 at the outer or upper edge of cylinder 35, compression springs 44' being employed to hold the sleeve valve 42 in its inward position, as shown. At its inner end, the sleeve valve 42 is provided with an annular piston 46 operating in an annular cylinder 47 surrounding the cylinder 35 and connected therewith by means of radial ports 48, as shown. By-passes 50 are arranged in the exterior wall of cylinder-piston 36 to cooperate with by-passes 49 formed in the interior wall of cylinder 35, so as to place ports 48 in communication with the interior of cylinder 35 as soon as the by-passes 49 are uncovered by cylinder-piston 36 in its downward stroke. Radial exhaust ports 51 are also provided in the walls of cylinder 35 in position to be thrown into communication with the corresponding ports 48 by means of the by-pass 50, thus effecting exhaust of cylinder 47. By this arrangement it will be observed, that as the cylinder-piston 36 moves downwardly, under the influence of the explosion in cylinder 35, as soon as by-passes 49 are uncovered, the piston 46 will be operated to raise sleeve valve 42 and exhaust the cylinder 35, and that as soon as by-passes 50 uncover ports 51, cylinder 47 will be exhausted to permit downward movement of sleeve valve 42 and close the ports 41.

In Fig. 5, I have illustrated a slightly modified form of construction which dispenses with the exhaust ports 51, suitable exhaust ports 51' being provided in the walls of cylinder 47 for the same purpose.

Ports 52 are formed in the walls of cylinder 35 communicating with air compression chambers 53 connected with cylinder 30 by means of passages containing check valves 54, shown in detail in Fig. 14, said check valves being fully illustrated and described in my copending application, filed October 13, 1916, Serial No. 125,491, and need no further description here, it being sufficient to state that the action of piston 34 operating in cylinder 30 is to maintain a supply of compressed air in the chambers 53, as will be readily understood.

Ports 55 are formed in the walls of cylinder-piston 36 and communicate with by-passes 56 formed in the outer walls thereof. Cooperating combined ports and by-passes 57 are formed in the walls of cylinder 35 and comunicate with an air chamber 57', as shown. An air pipe 58 leads from chambers 57' to a valve casing 59, as best shown in Figs. 4 and 15. Valve casing 59 is equipped with an oscillatory valve 60 operable by means of an arm 61 and connecting rod 62, as shown, and the valve casing 59 is connected by means of a pipe 63 with the lower end of an ordinary carbureter 64 connected at its upper end with a pipe 65, a branch pipe 66 leading from valve casing 59, to the pipe 65, as shown. Pipe 65 leads to a chamber 67 communicating through ports 68 with the interior of cylinder 35 and a by-pass 69 is formed in the lower inner walls of cylinder-piston 36. By this arrangement, when the ports 55 come in registration with ports 57 and ports 68 are uncovered by cylinder-piston 36, a forced blast of air passes through carbureter 64 and carries an explosive charge from said carbureter into the cylinder 35, the carbureter 64 being arranged to supply gasoline to the engine. By shifting valve 60 this supply of gasoline may be readily cut off and pure air supplied when desired. A port 70 is formed in the lower wall of cylinder 35 communicating with a passage 71 to which a carbureter pipe 58 is connected, the other carbureter pipe 65 being connected with another passage 71', leading to a port 72 located in the inner wall of cylinder 35, the arrangement being such that when port 72 is uncovered a blast of air is forced through a carbureter attached to pipes 58 and 65 to inject a supply of fuel therefrom into the cylinder 35, this carbureter being supplied with kerosene. Likewise, a similar port 73 is provided in the inner wall of cylinder 35 communicating with a passage 74 connected by pipe 65 with another carbureter which is, in turn, connected by pipe 58 with a passage 74' leading to a port 75 in the crank case 31, the arrangement being such that a supply of a different kind of fuel, preferably crude oil, is thus supplied to the cylinder 35. The cylinder 35 is provided with an air port 35', and the crank case 31 is provided with an air port 30' for admitting air to the lower portions of cylinder 35 and to cylinder 30 and crank case 31 at the proper times, to supply the fresh air for the air blast, as set forth.

By this arrangement, it will be observed, that three different kinds of fuel will be supplied to the engine cylinder 35 successively, and in such relation that the gasoline, or most easily applied fuel, will be directly associated with the spark plug so as to facilitate combustion of the other or less easily ignited fuels, thus permitting of operation of the engine very economically and with great efficiency.

A suitable cooling system is supplied for cylinder 35 and piston 38, through one or more openings 76 provided, as shown.

While I have illustrated and described the preferred forms of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. An internal combustion engine comprising an outer cylinder; a cylinder-piston within said outer cylinder; a piston within said cylinder piston; and means cooperating with said cylinder piston and said piston for supplying different kinds of fuel to one end of said outer cylinder, substantially as described.

2. An internal combustion engine comprising an outer stationary cylinder; a reciprocating cylinder-piston within said outer cylinder; a stationary piston within said cylinder-piston; and means cooperating with said cylinder-piston and said piston for supplying different kinds of fuel to one end of said outer cylinder, substantially as described.

3. An internal combustion engine comprising an outer cylinder closed at both ends; a cylinder-piston within said outer cylinder and closed at both ends; a piston within said cylinder-piston; and means cooperating with said cylinder-piston and said piston for supplying different kinds of fuel to one end of said outer cylinder, substantially as described.

4. An internal combustion engine comprising an outer stationary cylinder closed at both ends; a reciprocating cylinder-piston within said outer cylinder and closed at both ends; a stationary piston within said cylinder-piston; and means cooperating with said cylinder-piston and said piston for supplying different kinds of fuel to one end of said outer cylinder, substantially as described.

5. An internal combustion engine comprising an outer cylinder; a cylinder-piston within said outer cylinder; a piston within said cylinder piston; means cooperating with said cylinder piston and said piston for supplying different kinds of fuel to one end of said outer cylinder; an air cylinder coaxial with said outer cylinder; a piston in said air cylinder; and means for utilizing said air cylinder and piston for charging said one end of said outer cylinder, substantially as described.

6. An internal combustion engine comprising an outer stationary cylinder; a reciprocating cylinder-piston within said outer cylinder; a stationary piston within said cylinder-piston; means cooperating with said cylinder-piston and said piston for supplying different kinds of fuel to one end of said outer cylinder; an air cylinder co-axial with said outer cylinder; a piston in said air cylinder; and means for utilizing said air cylinder and piston for charging said one end of said outer cylinder, substantially as described.

7. An internal combustion engine comprising an outer cylinder closed at both ends; a cylinder-piston within said outer cylinder and closed at both ends; a piston within said cylinder-piston; means cooperating with said cylinder-piston and said piston for supplying different kinds of fuel to one end of said outer cylinder; an air cylinder co-axial with said outer cylinder; a piston in said air cylinder; and means for utilizing said air cylinder and piston for charging said one end of said outer cylinder, substantially as described.

8. An internal combustion engine comprising an outer stationary cylinder closed at both ends; a reciprocating cylinder-piston within said outer cylinder and closed at both ends; a stationary piston within said cylinder-piston; means cooperating with said cylinder-piston and said piston for supplying different kinds of fuel to one end of said outer cylinder; an air cylinder co-axial with said outer cylinder; a piston in said air cylinder; and means for utilizing said air cylinder and piston for charging said one end of said outer cylinder, substantially as described.

9. An internal combustion engine comprising an outer stationary cylinder closed at both ends, the outer side walls of said cylinder being provided with exhaust ports; a hollow cylinder-piston reciprocating in said outer cylinder and closed at both ends; a stationary piston operating in said cylinder-piston and co-operating therewith to supply fuel charges to said outer cylinder; a reciprocatory sleeve valve surrounding said outer cylinder and controlling the exhaust ports therein; springs arranged to hold said sleeve valve in port-closing position; an annular cylinder surrounding said outer cylinder; a reciprocatory annular piston in said annular cylinder and operatively connected with said valve sleeve; ports controlling the operation of said annular piston and controlled by said cylinder-piston; and means for supplying the combustible mixture to said outer cylinder, substantially as described.

10. An internal combustion engine comprising an outer stationary cylinder closed at both ends, the outer side walls of said cylinder being provided with exhaust ports; a hollow cylinder-piston reciprocating in said outer cylinder and closed at both ends; a stationary piston operating in said cylinder-piston and co-operating therewith to supply fuel charges to said outer cylinder; a reciprocatory sleeve valve surrounding said outer cylinder and controlling the exhaust ports therein; springs arranged to hold said sleeve valve in port-closing position; an annular cylinder surrounding said outer cylinder; a reciprocatory annular piston in said annular cylinder and operatively connected with said valve sleeve; ports controlling the operation of said annular piston and controlled by said cylinder-piston; means for supplying the combustible mixture to said outer cylinder; an air cylinder co-axial with said outer cylinder; a piston in said air cylinder; and means for utilizing said air cylinder and piston for charging said outer cylinder, substantially as described.

11. The combination with an internal combustion engine cylinder having one or more ports in the walls thereof, of a reciprocatory sleeve valve controlling said ports; a spring normally holding said sleeve in port-closing position; an annular cylinder surrounding said engine cylinder; an annular piston in said annular cylinder and operatively connected with said sleeve valve; and piston controlled ports arranged to admit combustion pressure to said annular cylinder to operate said sleeve valve to open said ports and to exhaust said annular cylinder after a definite period, substantially as described.

12. The combination with an internal combustion engine cylinder having one or more ports in the walls thereof, of a reciprocatory sleeve valve controlling said ports; a spring normally holding said sleeve in port-closing position; an annular cylinder surrounding said engine cylinder; an annular piston in said annular cylinder and operatively connected with said sleeve valve; piston controlled ports arranged to admit combustion pressure to said annular cylinder to operate said sleeve valve to open said ports and to exhaust said annular cylinder after a definite period; and ports through which fuels may be introduced into said engine cylinder, substantially as described.

In testimony whereof I have signed my name to this specification in the presence of two subscribing witnesses.

FREDERICK H. LEINWEBER.

Witnesses:
JOSHUA R. H. POTTS,
HELEN F. LILLIS.